April 13, 1954
H. H. GORRIE
2,675,015
FOLLOW-UP TYPE CONTROL VALVE
Filed June 22, 1950
2 Sheets-Sheet 1
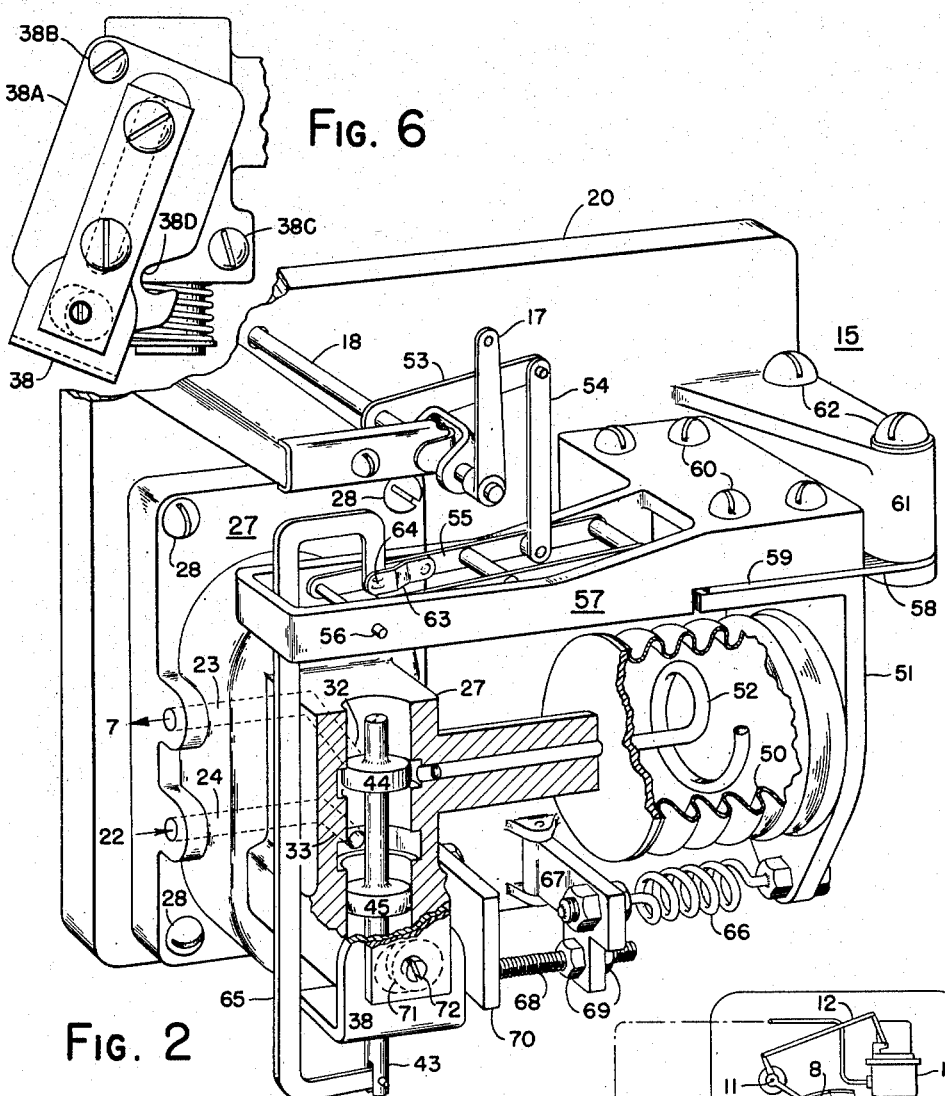
INVENTOR.
HARVARD H. GORRIE
BY
Raymond W Jumbenis
ATTORNEY

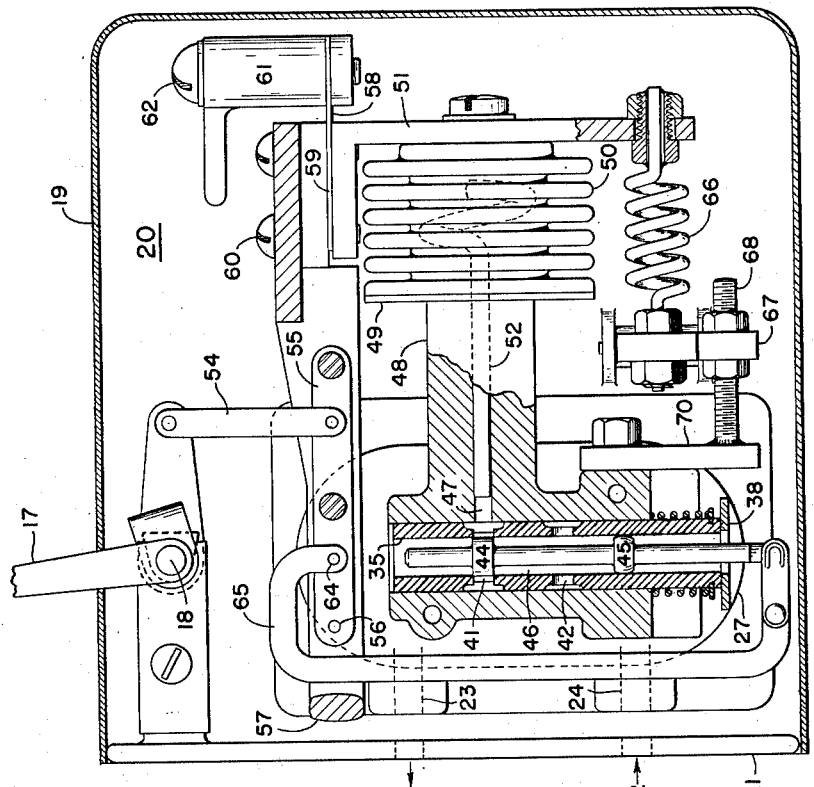

Patented Apr. 13, 1954

2,675,015

UNITED STATES PATENT OFFICE 2,675,015

FOLLOW-UP TYPE CONTROL VALVE

Harvard H. Gorrie, Cleveland Heights, Ohio, assignor to Bailey Meter Company, a corporation of Delaware Application June 22, 1950, Serial No. 169,751

14 Claims. (Cl. 137—85)

My invention relates to systems and apparatus for indicating, recording, or otherwise exhibiting and/or controlling the value of a position, measurement or variable. More particularly the invention relates to such systems wherein a fluid pressure is established representative of that which is to be measured or controlled and then the fluid pressure is used to actuate an exhibiting or controlling device.

While not necessarily so limited, the invention is particularly adapted and useful in pneumatic telemetering systems with air under pressure as the active fluid. The description of this specification is directed to apparatus employing pressure air by way of example only.

In accordance with my invention I establish a pneumatic loading pressure corresponding to, or representative of, the value of the position, measurement, or variable, and remotely exhibit the magnitude of the loading pressure, or use the loading pressure for control purposes.

My invention is particularly adapted to the telemetering of a value to an adjacent or remote point; or for amplifying the power of a responsive device, such as a Bourdon tube, flow meter, or the like, so that an exhibiting or controlling device may be accurately positioned.

A particular object of the invention is to provide a pneumatically operated power amplifier whereby the available power of the responsive device, such as a Bourdon tube, for positioning an exhibiting means or performing other useful work, is increased.

Another object is to provide a pneumatically operated telemetering system whereby a value of a variable, the position of a movable member, or the like, may be exhibited at a point remote from the point of measurement.

A further object is to provide apparatus whereby a relatively weak force representative of a variable value, condition, or position is amplified in translation into a pneumatic or similar fluid pressure and the amplified fluid pressure is made available for actuating exhibiting or controlling apparatus relatively adjacent or relatively remote from the measuring means. In this way a sensitive measuring instrument may be located adjacent the point of measurement and its resulting measurement may be amplified and transmitted over considerable distances to a desirable location for exhibiting or controlling apparatus. By transmitting the measurement through the agency of a pneumatic loading pressure, I avoid the many inaccuracies and time lags which have been experienced in the past with systems wherein the measuring instrument itself must of necessity be located on a panel board a considerable distance from the point of location of the variable which is to be measured.

It will be apparent as the description proceeds that my invention may be put to a wide variety of uses such as for exhibiting the value of a temperature, pressure, relative humidity, electromotive force, or for transmitting commands or other intelligence, all of which are to be considered as coming within the scope of my invention.

In the drawing:

Fig. 1 represents somewhat diagrammatically a pneumatic telemetric system embodying my invention.

Fig. 2 is a somewhat diagrammatic perspective drawing to about actual size of the transmitting mechanism shown in Fig. 1.

Fig. 3 is a side elevation, partially in section, to approximately actual size, of the commercial embodiment of the device shown in Fig. 2.

Fig. 4 is a side elevation, partially in section, of the device shown in Fig. 3.

Fig. 5 is a perspective drawing of one element of Fig. 4.

Fig. 6 is a detail of Fig. 4.

Referring to Fig. 1, I therein show my invention as incorporated in a pneumatic telemetering system comprising a transmitter and a receiver generally indicated at 1 and 2 respectively. The transmitter 1 is usually located at the point of measurement, whereas the receiver 2 may be located adjacent the transmitter or at a considerable distance therefrom, in the order of several hundred feet or more. Within the transmitter 1 is a drive arm 3 angularly positionable within predetermined limits about a pivot 4. The drive arm 3 may be positioned by any suitable means (not shown) in accordance with changes in the magnitude of the variable which it is desired to remotely indicate or exhibit. For example, the pivot 4 may be angularly moved by a Bourdon tube, flow meter, or the like. Likewise the drive arm 3 may be manually positioned, each position representing a certain command or other intelligence, so that such intelligence may be exhibited or used at the receiver.

Conveniently a movable index 5 may be positioned by and with the drive arm 3, which in cooperation with a graduated time revoluble chart 6 and scale 6A will exhibit at the transmitter the magnitude of the variable or intelligence which is being transmitted to the receiver. As will be understood by those familiar with the art, the chart 6 may be rotated by any suitable timing means and the index 5 arranged to inscribe a record thereon so that the value of the variable which existed at any previous time or the intelligence transmitted at any previous time may be readily ascertained.

The transmitter 1, through movements of the drive arm 3, is adapted to establish a pneumatic loading pressure corresponding to the magnitude of the variable or intelligence which is to be transmitted. Then pneumatic loading pressure so established is transmitted through a connecting pipe diagrammatically indicated at 7 to the receiver 2. Within the receiver 2 is a suitable mechanism for translating changes in the loading pressure into changes in the position of an index 8, which in the embodiment of my invention illustrated in Fig. 1 cooperates with a suitably graduated chart 9 and scale 9A to exhibit the value of the variable or intelligence which is transmitted. The specific exhibiting means which I have shown should be taken merely as illustrative, it being evident that such means are capable of a wide variety of modifications.

As diagrammatically illustrated in Fig. 1 the pipe 7 comunicates with a device 10 in the receiver 2. The device 10 forms no part of the present invention and may be a bellows or diaphragm mechanism responsive to the loading pressure in the pipe 7 and arranged to angularly move the index 8 around a pivot 11 through the agency of linkage 12. It will be apparent that if the loading pressure established within the pipe 7 is in linear relation with the variable, then the elements 10 and 12 may be so designed as to move the index 8 linearly with changes in said loading pressure over the chart 9 and scale 9A. Irrespective as to whether the relation between the variable and the loading pressure is linear or follows some other curve, the design of the elements 10 and 12 may take such relationship into account and either transmit the curve directly or vary it in some functional manner to produce upon the chart 9 and scale 9A a reproduction of the variable or a functional relation thereof.

In Fig. 1 I have diagrammatically indicated that the loading pressure in the pipe 7 not only effects an actuation of the exhibiting index 8 but may be connected by way of a pipe 7A with a diaphragm chamber 13 of a control valve 14 for controlling the same or another variable. Thus it is seen that the loading pressure established in the pipe 7, representative of the variable, may be used to exhibit the same or may be used as a motivating force in control. It is not deemed necessary to show what the valve 14 controls for it may control an agent affecting the variable or affecting some other variable. Neither is it necessary that the valve 14 be of the diaphragm type illustrated but it may be a power mechanism of any known sort which is activated responsive to the loading pressure in the pipe 7.

A particular feature of the present invention lies in the apparatus designated at 15 in the transmitter 1 of Fig. 1 and which is shown in detail in Figs. 2, 3, 4, 5 and 6. The drive arm 3, through a connecting rod 16, angularly positions an arm 17 about a pivot shaft 18. Movements of the arm 17 are therefore coincident with and of the same order of magnitude as movements of the drive arm 3.

While Figs. 3, 4, 5 and 6 show to approximately actual scale the present commercial form of device 15 I have felt it desirable for ease in understanding, to show Fig. 2 as a somewhat diagrammatic perspective of the device 15 with its cover or housing 19 removed. A base plate 20 provides a rigid mounting support for the various elements and allows the assembly as a whole to be readily located as a sub-assembly in an instrument such as the transmitter 1. Fig. 3 alone shows that the base plate 20 has an end plate 21 formed as an extension of the base plate.

Fig. 1 shows that the assembly 15 is joined by two pipes 7 and 22. The pipe 22 confines a supply of compressed air under pressure of, for example 28 p. s. i. The pipe 7 confines the loading pressure developed by the unit 15 as representative of the variable whose value is to be transmitted.

In Figs. 2 and 3 I indicate that the pipe 7 joins a passage 23 while the pipe 22 joins a passage 24. The passage 23 communicates with a generally cylindrical chamber 25 while the passage 24 communicates with a similar chamber 26; both chambers formed in a body member 27.

The body member 27 is held to the base plate 20 by screws 28 (Fig. 2). The chambers 25 and 26 are pressure sealed to the back plate 20 by O-ring gaskets 29, 29A. In Fig. 4 I show that the chambers 25, 26 contain filters 30, 31 respectively which are spring-pressed against one end of each of the chambers and in general across the entrance to passages 32, 33 which may be considered as extensions of the passages 23, 24. In other words, air moving between the passages 23 and 32 must pass through the filter 30 while air moving between passages 24 and 33 must pass through filter 31.

Referring now particularly to Figs. 3 and 4 it will be seen that the body member 27 has a cylindrical bore 34 communicating with one end of each of the passages 32 and 33. Within the bore 34 is a closely fitting but slidable sleeve 35 near the lower end of which is a groove containing spring C-washer 36 forming a shelf against which bears one end of a coil spring 37 whose other end bears on a shoulder of the body member 27 surrounding the bore 34 and sleeve 35. The tendency of the spring 37, acting upon the shelf 36, is to move the sleeve 35 downwardly in the bore 34. Restraining the sleeve 35 against such downward movement is an L-shaped member 38 shown in perspective in Fig. 5 and referred to hereinafter.

As shown in Figs. 3 and 4 the sleeve 35 is circled at its outer surface by a channel 39 generally adjacent the opening of the passage 33 into the bore 34 and also by a channel 40 generally adjacent the opening of the passage 32 into the bore 34. The width of the channels 39 and 40 axially relative to the sleeve 35 is greater than is the diameter of the passages 32 and 33 so that the sleeve 35 may have some longitudinal movement in the bore 34 without destroying the registry of the channels with the passages 32, 33.

Communication between the interior bore of the sleeve 35 and the channel 40 is established by one or more port openings 41. The present embodiment desirably has three equally spaced ports 41 which are about $\frac{1}{16}''$ square. Under certain conditions of operation round ports would be satisfactory but in the present embodiment I have found that square ports give an increased speed and sensitivity.

Communication between the interior of the sleeve 35 and the groove 39 is established by a plurality of supply ports 42 which may be round and of $\frac{1}{16}''$ to $\frac{1}{8}''$ in diameter.

Axially movable within the bore of the sleeve 35 is a pilot valve stem 43 having an upper sharp-edge land 44 substantially closing the ports 41; and also having, spaced from the land 44, a second land 45 which may be slightly rounded. The location of the land 45 relative to the land 44 and the ports 41 and 42, is not particularly critical, it being only necessary (referring to Figs. 3 and 4) that it be below the ports 42 to generally seal off the interior bore of the sleeve 35 and prevent pressure fluid from the ports 42 bleeding to atmosphere around the lower end of the stem 43. At least the land 45 must minimize such wastage and to this end both the land 44 and the land 45 are accurately machined to a minimum clearance for axial movement within the sleeve 35.

The land 44, in cooperation with the ports 41, form the pilot valve proper controlling the passage of air from the space 46 into the passageways 32 and 47 or from passageways 32, 47 to the atmosphere through the upper end of the bore 34. The space 46 is that annular space defined by the interior wall of the sleeve 35 and the exterior of the pilot stem 43, between the upper surface of land 45 and the lower surface of land 44. This space 46 is supplied with air at the supply pressure of (for example) 28 p. s. i. through pipe 22, passage 24, filter 31, passage 33, channel 39, and port openings 42. Thus supply air pressure is always available in the space 46 regardless of the position of the stem 43 in its limited possibility of axial positioning.

As shown in Figs. 3 and 4 the land 44 effectively seals the ports 41 preventing free passage of air from the space 46 to the passages 32 and 47. If the pilot stem 43 is moved upwardly, then the lower cutoff edge of land 44 departs from the lower edge of ports 41 resulting in an opening therebetween through which air under pressure from the space 46 is available in the passages 32 and 47. Depending upon the extent of upward movement of the stem 43 and the length of time the opening through ports 41 exists the pressure in passages 32 and 47 may build up to or equal the pressure within the space 46.

From the position shown, if the stem 43 is moved downwardly the passages 32 and 47 are allowed to communicate and bleed to atmosphere through the upper end of bore 34. Such action reduces the pressure within the passages 32 and 47 and the reduction may be carried to a limit of atmospheric pressure. It will thus be seen that the pressure of the fluid within the passages 32 and 47 may be held at a given value by the complete registry of land 44 with the ports 41 or the pressure in the passages may be built up or may be lowered by movement of the pilot 43 upwardly or downwardly respectively.

The body member 27 has an extension 48 (Fig. 3) to which is fastened the stationary end 49 of a bellows 50 whose movable end is fastened to an L-shaped plate 51. The bellows 50 thus forms an expansible-contractible chamber between the closure plates 49, 51. Communication to the interior of the chamber formed by the bellows 50 is had through the passage 47. In the passage 47 is a close fitting capillary tube 52. The capillary tube 52 enters the chamber 50 making a turn as diagrammatically shown in Fig. 3. This construction offers one of alternate ways of restricting fluid flow to and from chamber 50. I might reduce the opening of passage 47, or provide it with a throttling orifice, but either would be more susceptible to fouling and more difficult to make and service than the capillary 52 which may be readily cut to desired length. For convenience the capillary within chamber 50 is coiled to prevent contact with any portion of the movable wall of the chamber. This further prevents any jet or impingement of fluid pressure against the closure plate 51. Thus a restriction is provided which minimizes a type of fluttering action in devices of this type called "motorboating."

The operation of the device in brief is as follows. The measuring element, such as a flow meter, positions the arm 17 which causes a positioning of the pilot stem 43 to increase or decrease pressure within the pipe 7 and within the bellows 50. The bellows 50 acts to reposition the pilot 43 to the end that pressure within the pipe 7 is always representative of the position of the arm 17 and thus representative of the variable being measured.

Angular movement of the arm 17 around the pivot shaft 18 is transmitted through arm 53 and link 54 to a floating type differential member 55. The member 55 is pivoted near one end, as at 56, to a member 57 angularly moved with the L-shaped plate 51 about a center generally indicated as 58. The imaginary axis 58 of angular motion is embodied in a leaf spring 59 which is clamped between the member 57 and one leg of the L-shaped plate 51 by means of screws 60. The other end of the leaf spring 59 is held to an extension 61 of the base plate 20 by screws 62. Referring to Figs. 2 and 3, an increase in pressure within the chamber 50, acting upon the plate 51, tends to produce a counterclockwise rotation of the elements 51 and 57 about an axis 58 due to the flexure of the spring plate 59. Thus an increase in pressure within chamber 50 tends to move the pivot shaft 56 downwardly as shown in the drawing.

Attached to the differential member 55 between the connection point of link 54 and pivot shaft 56 is an arm 63 carrying a pivot 64 to which is linked a yoke 65.

It will be seen that a clockwise movement of lever arm 17, acting through the elements 18, 53 and 54, moves the right hand end of the member 55 downwardly about pivot shaft 56 thus proportionately moving the yoke 65 and pilot stem 43 downwardly. This results in a movement of land 44 downward relative to the ports 41 allowing pressure from within the chamber 50 and from within the pipe 7 to bleed to atmosphere. As pressure within the chamber 50 decreases, the bellows contracts thus moving the end plate 51 and the member 57 both in a clockwise rotation around the pivot axis 58, resulting in an upward positioning of the pivot shaft 56, link 63, pivot 64 and yoke 65. This results in an upward movement of the pilot stem 43 tending to return the land 44 to a shut-off position relative to the ports 41. A balance condition of stability is reached when, for any given position of the lever 17, the pressure within the chamber 50 has increased or decreased to a value representative of the position of 17 whereby the return positioning of the pilot 43 through the agency of the bellows 50 acting in turn on 55 stops any further change in pressure within bellows 50. The result is that for any position of the arm 17 there is a corresponding pressure within the chamber 50 and simultaneously within the passage 32, chamber 25, passage 23 and pipe 7.

Loading the bellows 50 and its contained pressure is a spring 66 locked to the plate 51 and to a hinged plate 67. For adjusting the initial tension of the spring 66 I provide a screw 68 with locking nuts 69; the screw 68 being fastened to a member 70 rigid with respect to the base plate 20. The illustrated construction of spring 66 is one allowing quantity production to predetermined specifications as to overall distance between mounting nuts, as well as range or rate. Thus these spring assemblies may be made up ahead in large quantities with an assurance of interchangeability of dimension and characteristic. Furthermore, a series of such springs, of uniform length, but of different spring rate allows ready change of range of the unit.

For adjustment of the sleeve 35 relative to the pilot stem 43 I provide the arm 38 which may be vertically positioned relative to the body member 27 by means of an eccentric or cam 71. The eccentric 71 has an off-center shaft 72 bearing in a plate 38A and having a screw-driver slot at its exterior end.

As clearly shown in Fig. 5 the eccentric acts in a slot 73 of the arm 38 to the end that angular adjustment of the eccentric shaft 72 by way of a screw-driver, for example, results in a positioning of the lever 38 in an upward or downward direction along the surface of the plate 38A and confined in its path by a plate 74. Locking screws 75 pass through a slot 76 of member 38 into the plate 38A. A clearance hole 77 is provided in the horizontal leg of member 38 to allow free passage of the pilot 43 but is not large enough to clear the sleeve member 35.

In Fig. 6 I show a view along the line 6—6 of Fig. 4, in the direction of the arrows. The plate 38A is held against body member 27 by screws 38B and 38C, the former acting through a clearance hole in plate 38A while screw 38C passes through a clearance slot 38D in plate 38A. Fig. 6 shows the plate 38A swung clockwise about loosened screw 38B for a purpose to be later explained.

The operation is as follows. Preferably the assembly is to be so adjusted that the land 44 is in alignment with the ports 41 when the differential member 55 is in a predetermined position, usually horizontal or normal to the axis of the pilot 43. Placing the member 55 in that position fixes the location of the pilot stem 43. If the land 44 and ports 41 are not then in desired interrelation, the proper adjustment includes an axial positioning of the sleeve 35 until the desired relationship is reached. The clamping screws 75 are eased off and the member 38 is moved upwardly or downwardly by rotation of the eccentric 72. Such movement of the member 38 moves the sleeve 35 against the resistance of the spring 37 and with the arm 38 sliding between the body member 27 and the retaining plate 74. When desired location of the sleeve 35 relative to the pilot 43 is reached the screws 75 are again tightened thus locking the plate 38 in desired position. The adjustment just described is with the plate 38A (Fig. 6) is vertical position wherein screw 38C registers with slot 38D and with both screws 38B and 38C tightened to body member 27.

If, at some later date, it is desired to examine or clean the pilot stem 43 and sleeve 35, this is possible without varying the adjustment just described. The lower pivot of yoke 65 is disconnected from the lower end of pilot stem 43 allowing the latter to slide downwardly out of sleeve 35 by gravity. The screws 38B and 38C are loosened and the plate 38A is moved clockwise. Such movement carries with the plate 38A the parts 38, 71, 74, all of which remain held in desired interrelation to plate 38A by screws 75. The angular movement of the assembly, about screw 38B is continued until the lower portion of bent member 38 passes out of its retaining position for spring 37 and sleeve 35. Thereupon the screw 38B may be tightened to retain the assembly in its swung-out position. The relief of restraint upon spring 37 allows the spring to move sleeve 35 downwardly for removal. After the sleeve 35 has been cleaned and replaced, the plate 38A and the parts carried thereby may be returned to normal position and the screws 38B, 38C tightened, with assurance that proper interrelation of stem 43 and sleeve 35 has not been disturbed.

It will be evident that a change of spring 66 will vary the range of air loading pressure for a given angular movement of the arm 17. Preferably this may be in a range of 5–25 p. s. i. but obviously some other range, such for example as 0–40 p. s. i., may be readily employed. The adjustment provided by the eccentric 71, namely for relative positioning of the pilot stem 43 and the sleeve 35, provides not only a zero adjustment but also the possibility of minimizing non-linearity of characteristic by adjusting the relative position of the various members of the linkage at the center of the range or at any other predetermined point in the range of loading pressures. The adjustment of screw 68, by nuts 69 provides a vernier zero adjustment.

It will be seen that through my improved device or apparatus a relatively weak measuring force at one location may be instrumental in establishing a greatly amplified loading pressure force which is capable of being transmitted considerable distances and provides an amplified power at the receiver for positioning either an exhibiting means or a controlling means. I obviate time lag and many other errors incident to having a low power availability instrument itself located a considerable distance from the point of measurement. Furthermore, I provide an amplified force which may be put to a multitude of uses at the same or diverse location. For example, the loading pressure within the pipe 7 may supply a plurality of exhibiting devices and/ or control devices which may be closely grouped or may be scattered in various locations.

The operation is of the null type wherein a position is produced proportional to the magnitude of the variable and the loading pressure caused to produce a position acting in opposition to the first position so that a balance is continuously maintained between the two and then there is remotely indicated the value of the second or proportional position. This is known as a position balance system to transmit a pressure representative of the position of a transmitter element.

With my invention a fluid pressure is established for each value of the variable. Usually it is desirable that the relation between incremental movement of lever 17 and the loading pressure established in pipe 7 be linear. One factor which could distort the relationship from linearity is angularity of position and interrelation of the linkage. To minimize such a possibility I adjust the mechanism at mid-travel and in the present embodiment this is with member 57 and differential member 55 both horizontal and parallel to each other. Under this condition and with arm 17 at mid-travel position I adjust eccentric 71 which is the means for positioning the sleeve 35 in relation to the pilot stem 43 so that the middle of the fluid pressure output range exists in chamber 50 and pipe 7. Another adjustment means includes the screw 68 and lock nuts 69 for varying the initial tension of loading spring 66 by means of which I slightly vary the output pressure range of the device and give a vernier zero adjustment.

These are the only adjustments necessary with my pneumatic transmitter. I primarily desire to establish a definite relation between full motion of measurement lever 17 and output loading pressure in pipe 7 as a transducer from a relatively weak motion to a relatively powerful control pressure. The apparatus need not be complicated by the inclusion of proportional band (sensitivity) or set point (standard) adjustment, or the like.

The result is an extremely simple and rugged transducer having a wide range, substantially linear in output, and more sensitive, more easily calibrated, and with less hysteresis than known devices of this general type. One particular feature lies in the means for positioning the pilot stem 43. It will be seen that the yoke 65 is shaped as a C with the lower end pivotally supporting the gravity weight of pilot stem 43. The considerable length of the link 65, as compared to a very short link which might be used to suspend the upper end of pilot stem 43 from pivot 64, minimizes any tendency for the pilot stem assembly 43 to have its lands 44, 45 bind in the bore of sleeve 35 or create excessive friction or wear. While rigid, the C-shaped yoke 65 has a certain amount of resiliency in transmitting motion from the member 55 to the pilot stem 43. Any tendency to misalignment in motion between the path of movement of pivot 64 and the axial positioning of stem 43, in any plane, is completely obviated by the method of support.

As shown in Fig. 2, under steady state the differential member 55, bell crank 51, take-off link 65 and pilot valve couple 44, 45 are in the same or parallel planes, and the differential member and one bell crank arm are generally normal to the motion take-off link, valve couple, and the other bell crank arm.

Additionally the preferred construction provides a substantially self-compensating arrangement for ambient temperature changes. Ambient temperature change causes the various pivots throughout the mechanism to shift position. Also the spring rate of the bellows 50 and spring 66 may be caused to change somewhat. The extent of these changes, measured by their individual effects upon the stability of output can not be separated, but their collective effect can be compensated by my mechanism.

With the arrangement of the C-shaped yoke 65 between member 55 and pilot stem 43 providing a long, straight run of arm, a material can be empirically determined which will respond to ambient temperature changes so as to stabilize the output of the pilot valve. Therefore, regardless of how temperature changes will tend to move pilot stem 43, arm 65 will elongate or contract, because of its predetermined coefficient of expansion, to maintain stem 43, with its land 44, in the relative position with sleeve 35 which will maintain a constant output. It has been determined, in this particular arrangement, that a link composed of 12% chrome and 12% nickel is a stainless steel which will allow only 0.1 p. s. i. variation per 100° F. ambient temperature change in the output.

The apparatus is theoretically of the null balance type of motion balance or position balance system wherein theoretically the restoring bellows 50 always brings the land 44 back to a shut-off position relative to the ports 41 when the loading pressure within pipe 7 and chamber 50 is that value representative of the position of arm 17. The null method is one of comparing or measuring physical quantities, in which the indictator (pilot stem land 44) of the testing device remains at zero (relative to the pilot ports 41) when the quantities (meter value-loading pressure) balance.

While theoretically the land 44 is returned to a complete shut-off relation to ports 41 whereby the newly established pressure is locked in pipe 7 and chamber 50; actually this theoretical condition could only be attained if there were no clearance between the movable land 44 and the interior diameter of sleeve 35 and if the axial dimension of the land 44 were exactly the same as the axial dimension of the square ports 41. With the normal tolerances of manufacture, however, the length of the land is specified as .0615 to .0605" while the axial dimension of the ports 41 is specified as .0620 to .0630". Thus there is a possibility of the land length being less than port length by a range of .0005 to .0025. Splitting this maximum shows that there is a possibility of as much as .0012" clearance between the lower side of land 44 and entrance to port 41 and the same possibility between the upper surface of land 44 and entrance to port 41. Thus, while for all intents and purposes the land is a complete shut-off type relative to the ports 41, there is a possibility, at the central neutral position, of a minute pressure entrance to ports 41 below land 44 and a minute rate of bleed from ports 41 to the atmosphere above the land 44. With this condition in mind it is seen that a balance will be reached, for each position of the lever 17, wherein the restoring bellows will tend to return the pilot land to its original neutral or shut-off position but perhaps not quite reach that position. In other words, there may theoretically be a geared relation of pilot land-port position for each pressure in the pipe 7 and chamber 50. However, the change in basic balance or stable position of the land relative to the ports, throughout the range of pressure, is so minute that it is in the nature of a fraction of a thousandth of an inch and may be neglected and the mechanism may be considered as of the null type.

I have found that with this particular construction being described the total range of movement of the pilot stem to accomplish a range of pressure change of 5 to 25 p. s. i. is about .003" although, due to the volume characteristics of the different passages and chambers, there is an over-shoot characteristic upon change in the variable but this is not undesirable. In other words, upon a sudden material change in the value of the variable with consequent considerable movement of the arm 17 the land 44 will be moved an appreciable distance even in the nature of 1/8" or 3/16" from its neutral position before the effect of such change, acting through the passage 47, the capillary 52 and upon the volume chamber 50, causes the restoring bellows to move the land 44 back into its .003 range of normal operation. This immediate excessive change in pressure is not detrimental but is in fact beneficial in connection with a relatively long connecting pipe 7 having considerable total volume.

The telemetering of measurement values by pneumatic means demands a very high degree of accuracy and a very high speed response. The present invention provides these advantages.

Any possible tendency to misalignment of motion of the stem 43 in the bore of sleeve 35 is counteracted by a slight rounding of the land 45. In other words, this obviates the extremely difficult machining operation or seeing that the otherwise cylindrical surfaces of lands 44 and 45 are identical as to diameter and identically in alignment with each other and with the bore of sleeve 35. Inasmuch as the land 45 performs only a sealing operation to prevent loss of supply air it may have substantially a line contact with the wall of the sleeve 35.

The preferred construction of sleeve 35 allows a high degree of accuracy in manufacture. The interior and exterior are true cylindrical surfaces which may be readily ground to individual accuracy and parallelism. The single piece construction avoids the costly prior art difficulties of separate cylindrical sleeve sections, assembled end-to-end, in which not only must the individual pieces be made to the closest tolerances, but the assembly must have an over-all accuracy and alignment which is difficult to attain.

While I have chosen to illustrate and describe my preferred commercial arrangement and form of apparatus, it will be understood that this is by way of example only.

What I claim as new, and desire to secure by Letters Patent of the United States, is:

1. A transmitter for a pneumatic telemetering system, including in combination, a measurement member movable in accordance with a variable to be transmitted, a differential member to which the measurement member is pivotally connected for moving the former, a bell crank supported at its apex by a flat leaf spring and having an arm arranged to position the differential member, a motion take-off link pivotally connected to the differential member intermediate the pivot and measurement member, a fluid pressure pilot valve having a pair of relatively movable valve elements, one of said elements positionable by the said link to regulate the application of a pressure fluid from a pressure source through the valve element couple to an outlet therefrom, an expansible-contractible chamber receiving the fluid pressure output of said couple and having a movable wall forming another arm of said bell crank, a loading spring opposing pivoting of the bell crank by the expansible-contractible chamber, and an output discharge connection to the telemetric system also receiving the fluid pressure output of said couple, the differential member counteractingly positioned by the measurement member and the one bell crank arm to the end that the pilot valve couple assumes a null position when a predetermined fluid pressure exists in the expansible-contractible chamber for each position of the measuring member.

2. A transmitter for a pneumatic telemetering system, including in combination, a measurement member movable in accordance with a value, position, or other variable to be transmitted, a floating differential member to which the measurement member is pivotally connected for moving the former, a bell crank supported at its apex by a flat leaf spring to pivot around an imaginary axis normal to flexure of the spring and having an arm arranged to position the differential member, the measurement member and the bell crank arm applying their movement forces in spaced relation along the floating differential member, a motion take-off link pivotally connected to the differential member intermediate said spaced relation, a fluid pressure pilot valve having a pair of relatively movable valve elements, one of said elements positionable by the said link to regulate the application of a pressure fluid from a pressure source through the valve element couple to an outlet therefrom, an expansible-contractible chamber receiving the fluid pressure output of said couple and having a movable wall forming another arm of said bell crank, a loading spring opposing movement of said other bell crank arm, and an output discharge connection to the telemetric system also receiving the fluid pressure output of said couple, the differential member counteractingly positioned by the measurement member and the one bell crank arm to the end that the pilot couple assumes a null position when a predetermined fluid pressure exists in the expansible-contractible chamber for each position of the measuring member.

3. The device of claim 2 wherein the valve element positionable by the motion take-off link is a pilot valve stem and in which the motion take-off link is in general C-shaped and supports the gravity weight of the pilot stem while being pivotally connected to the bottom of the stem when the assembly is in an upright position with the upper end of the C-link pivotally connected to the superposed differential member.

4. The device of claim 3 in which the motion take-off link is composed of material whose coefficient of expansion adjusts the distance between its pivot points to maintain stability of the output under ambient temperature variations.

5. The device of claim 4 in which the motion take-off link is approximately 12% chrome and 12% nickel stainless steel.

6. The device of claim 3 in which under steady state the differential member, bell crank, link and pilot couple are in the same or parallel planes and the differential member and one bell crank arm are in general normal to the motion take-off link, valve couple, and other bell crank arm.

7. A device for continuously establishing a fluid loading pressure in substantially linear relation to the value of a variable, including in combination, a floating differential member arranged to receive a positioning movement representative of the variable, pilot valve means establishing the fluid loading pressure, a usage out-passage receptive of the fluid loading pressure, an expansible-contractible bellows chamber receptive of the fluid loading pressure and having a part positionable thereby, conduit means connected to the usage out-passage and including a capillary tube discharging freely in said chamber, said capillary being coiled within the chamber to direct the supply of loading pressure around the inside periphery of said chamber away from the chamber part, a force loading means for the chamber part, means transmitting motion of said part to the differential member, and mechanical means regulating said pilot valve from said differential member in accordance with the motion balance relation of the positionings imposed upon the differential member.

8. The device of claim 7 wherein the pilot valve has a pair of relatively movable elements the one stationary and the other positionable by said regulating mechanical means, the elements in steady state or null position substantially locking the developed fluid loading pressure in the expansible-contractible chamber and the usage out-passage.

9. A transmitter for a fluid type telemetering system, including in combination, a measurement member movable in accordance with a variable to be transmitted, a differential member to which the measurement member is pivotally connected for moving the former, a bell crank supported at its apex by resilient hinge means and having an arm arranged to position the differential member, a motion take-off link pivotally connected to the differential member intermediate the pivot and measurement member, a fluid pressure pilot valve having a pair of relatively movable valve elements, one of said elements positionable by the said link to regulate the application of a pressure fluid from a pressure source through the valve element couple to an outlet therefrom, an expansible-contractible chamber receiving the fluid pressure output of said couple and having a movable wall integral with another arm of said bell crank, a loading spring opposing pivoting of the bell crank by the expansible-contractible chamber, and an output discharge connection to the telemetric system also receiving the fluid pressure output of said couple, the differential member counteractingly positioned by the measurement member and the one bell crank arm to the end that the pilot valve couple assumes a null position when a predetermined fluid pressure exists in the expansible-contractible chamber for each position of the measuring member.

10. A device for continuously establishing a fluid loading pressure in substantially linear relation to the value of a variable, including in combination, a floating differential member having a pivot and arranged to receive a positioning movement representative of the variable, pilot valve means establishing the fluid loading pressure, a usage out-passage receptive of the fluid loading pressure, an expansible-contractible bellows chamber receptive of the fluid loading pressure and having a stationary end and a movable end, resilient loading means opposing expansion movement of said movable end, a fixedly supported spring hinge, a rigid connection between the movable end of the bellows chamber and the differential member and supported intermediately by said hinge for transmitting motion of said movable end to the differential member to position the pivot thereof, and mechanical means regulating said pilot valve from said differential member in accordance with the positionings imposed upon the differential member.

11. A transmitter for a pneumatic telemetering system, including in combination, a measurement member movable in accordance with a variable to be transmitted, a differential member to which the measurement member is pivotally connected for moving the former, a bell crank supported at its apex by a flat leaf spring and having an arm arranged to position the differential member, a motion take-off link pivotally connected to the differential member intermediate the pivot and measurement member, a fluid pressure pilot valve body having a pair of relatively movable internal valve elements, one of said elements positionable by the link to regulate the application of a pressure fluid from a pressure source through the valve element couple to an outlet therefrom, a single pivoted adjusting support member carried by the pilot valve body for the other of said valve elements, an expansible-contractible chamber receiving the fluid pressure output of said couple and having a movable wall forming another arm of said bell crank, a loading spring opposing pivoting of the bell crank by the expansible-contractible chamber, and an output discharge connection to the tele- metric system also receiving the fluid pressure output of said couple, the differential member counteractingly positioned by the measurement member and the one bell crank arm to the end that the pilot valve couple assumes a null position when a predetermined fluid pressure exists in the expansible-contractible chamber for each position of the measuring chamber.

12. A transmitter for a fluid type telemetering system, including in combination, a measurement member movable in accordance with a variable to be transmitted, a differential member to which the measurement member is pivotally connected for moving the former, a bell crank supported at its apex by resilient hinge means and having an arm arranged to position the differential member, a motion take-off link pivotally connected to the differential member intermediate the pivot and measurement member, a fluid pressure pilot valve body having a pair of relatively movable valve elements, one of said elements positionable by the said link to regulate the application of a pressure fluid from a pressure source through the valve element coupled to an outlet therefrom, an adjusting support member including, a base plate pivoted from the pilot valve body, a support plate for the other of the valve elements carried by the base plate, and an adjustable eccentric member for moving the support plate relative to the face plate and the other of the valve elements; an expansible-contractible chamber receiving the fluid pressure output of said couple and having a movable wall integral with another arm of said bell crank, a loading spring opposing pivoting of the bell crank by the expansible-contractible chamber, and an output discharge connection to the telemetric system also receiving the fluid pressure output of said couple, the differential member counteractingly positioned by the measurement member and the one bell crank arm to the end that the pilot valve couple assumes a null position when a predetermined fluid pressure exists in the expansible contractible chamber for each position of the measuring member.

13. In combination with a fluid pressure pilot valve body including a pair of relatively movable valve elements, means for positioning one of the elements in accordance with a pressure to be established, a pivotable support member for the other valve element movable into and out of engagement with the valve elements, and structure for adjusting the support member in relation to the pilot valve body when said other valve element is being supported.

14. The combination of claim 13 wherein the pivotable support member includes a plate pivoted from the valve body, a support plate provided with a slot carried by the pivoted plate, and the adjusting structure includes an eccentric body, said pivoted plate adapted to carry said eccentric body in such manner that the body cooperates with said slot in the support plate to change the relative positions of the pivoted plate and the support plate.

References Cited in the file of this patent

UNITED STATES PATENTS

| Number | Name | Date |
|---|---|---|
| 1,549,745 | Church | Aug. 18, 1925 |
| 2,016,824 | Smith | Oct. 8, 1935 |
| 2,169,982 | Von Manteuffel | Aug. 15, 1939 |
| 2,441,044 | Tate | May 4, 1948 |
| 2,631,570 | Bowditch | Mar. 17, 1953 |